Dec. 24, 1935.                A. A. STILL                2,025,253
                  SAFETY LATCH FOR GEAR SHIFT LEVERS
                         Filed July 12, 1935
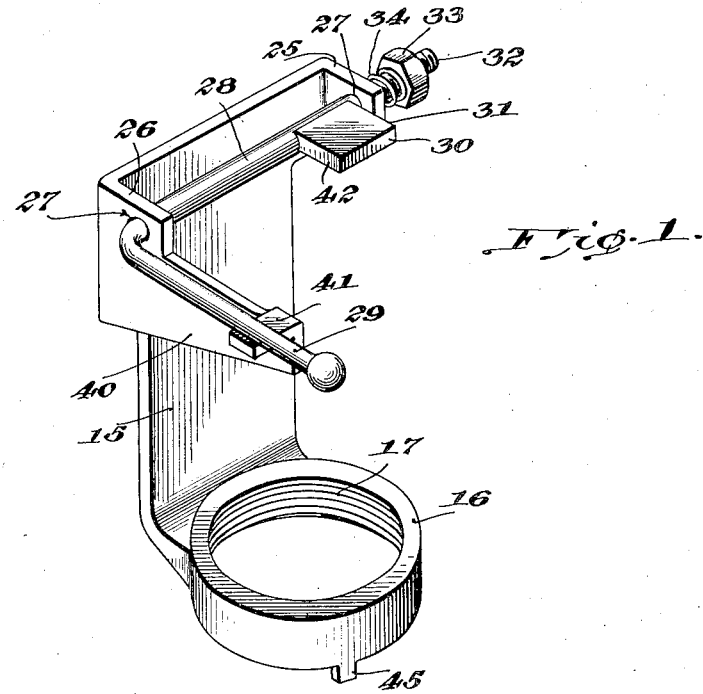
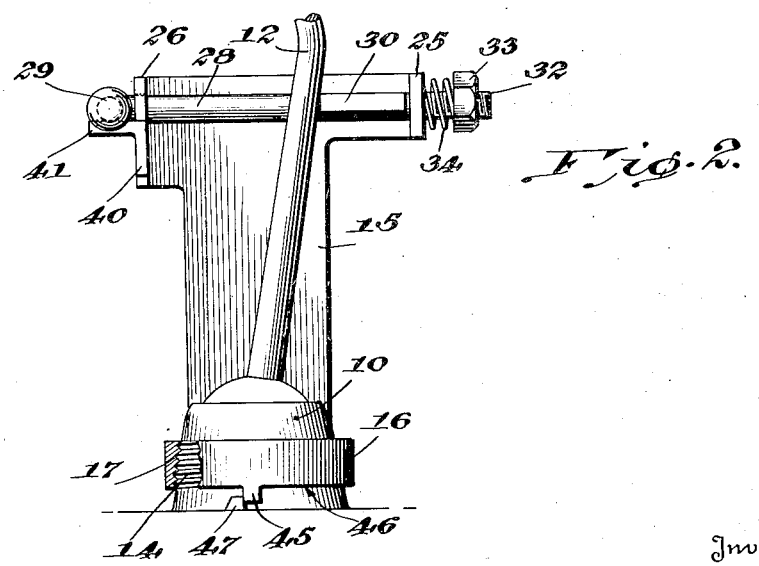
Inventor
Abram A. Still,
By Munn, Anderson + Liddy
                       Attorneys Patented Dec. 24, 1935

2,025,253

UNITED STATES PATENT OFFICE 2,025,253

SAFETY LATCH FOR GEAR SHIFT LEVERS

Abram Allen Still, Annette, Calif.

Application July 12, 1935, Serial No. 31,058

3 Claims. (Cl. 74—475)

This invention relates to a safety latch for automobile gear shift levers of the type described and claimed in my application Serial No. 715,224, filed March 12, 1934 and is more particularly directed to a means for removably attaching the safety latch to the usual housing for gear shift levers.

In the standard type of gear shift levers, the lever is moved rearwardly and towards the driver from a neutral position for low speed. The lever is moved for an intermediate speed forwardly to the neutral position, then to the right, and then forwardly. A high speed is obtained by moving the gear shift lever in a line directly rearwardly. If it be desired to provide for a reverse speed, the lever must be moved to the neutral position from any of the positions stated above and then shifted through the neutral position to the left adjacent the driver and then forwardly.

In a certain type of automobile the low speed position of the gear shift lever is directly opposite to that of the standard low position and at a point where the reverse speed position of the standard type is located. In changing from the standard type to the special type of gear shift levers just mentioned, and vice versa, it sometimes happens that the operator unconsciously will move the gear shift lever to the reverse position instead of to the low speed position or will move the gear shift lever to the low speed position instead of to the reverse position. This incorrect movement of the gear shift lever is the cause of considerable accidents.

Even in the standard gear shift lever the operator occasionally moves the lever past the neutral position into the reverse when such position is not intended.

It is an object of the invention to provide a safety latch for gear shift levers which will prevent the operator from moving the gear shift lever to reverse position unless he remove the latch to an inoperative position to permit the proper positioning of the lever for reversing the car.

An object of the invention is the provision of a safety latch for gear shift levers having means for readily attaching the safety latch to the gear shift lever housing in which an internally threaded ring carried by the safety latch is adapted to be screwed onto threads which may be formed directly on the gear shift lever housing or on a ring which is welded or secured in any approved manner to the housing.

A further object of the invention is the provision of a means for readily attaching a safety latch for gear shift levers to the usual gear shift housing in which a threaded member on the safety latch is screwed onto threads carried by the housing, a lug projecting from the threaded member adapted to engage a stop on the housing for properly positioning the latch member with respect to the lever when said lever has been moved into a reverse position.

This invention will be best understood from a consideration of the following detailed description, in view of the accompanying drawing forming a part of the specification; nevertheless, it is to be understood the invention is not confined to the disclosure, being susceptible of such changes and modifications as define no material departure from the salient features of the invention as expressed in the appended claims.

In the drawing:

Figure 1 is a view in perspective of a safety latch and securing means in accordance with the principles of my invention, and Figure 2 is a side view in elevation of the safety latch applied to a gear shift housing.

Referring more particularly to the drawing, 10 designates a housing forming an auxiliary part of a transmission casing (not shown). A gear shift lever 12 projects through the housing and may be oscillated to definite positions describing the letter "H" for moving said lever from its neutral position to first and second speeds and to high speed or the lever may be moved from any of these positions to the reverse position.

The outer surface of the housing 10 may be provided with a plurality of threads 14 or a ring may be formed with a plurality of exterior threads and this ring is then welded or secured in any approved manner to the outer surface of the housing 10. It will be noted that the threads are tapered in accordance with the tapering of the housing 10.

A bracket in the form of a metal plate 15 rises from the housing at one side of the gear shift lever 12 and has at its lower end a ring 16 which is provided with internal threads 17 on the inner surface which is tapered complementarily to the tapering of the outer surface of the housing 10. The side edges of the plate are provided with a pair of inturned flanges 25 and 26. These flanges are provided with openings 27 forming bearings for a rock shaft 28 which has its ends extending beyond the outer surfaces of the flanges 25 and 26. These flanges are located in parallel relation and project forwardly from the plate 15.

An operating arm 29 projects at right angles from one end of the shaft and is adapted to be normally positioned horizontally when the shaft 28 and a latch member or block 30 are disposed in an operative position. The latch member is secured to the other end of the shaft 28 in any approved manner and has one edge 31 in contact with the flange 25.

The outer end of the shaft is threaded, as shown at 32, to receive a nut 33. A coil spring 34 embraces the shaft between the nut 33 and the flange 25 and exerts a pull on the shaft to provide frictional resistance against the turning of the shaft.

The flange 26 is provided with an extension 40 having a laterally disposed lug 41 upon which the arm 29 is adapted to normally rest in a horizontal position. The latch member 30 is provided with a straight edge 42 at one end to engage the latch 12 and to prevent said lever from being moved into the reverse position while the arm 29 and latch member 30 are disposed in a horizontal position, as shown more particularly in the figures. A lug 45 projects from the lower edge 46 of the ring 16 and is adapted to engage a stop 47 carried by the housing 10. The lug 45 and the stop 47 are so positioned that when the ring 16 is screwed upon the threads 14 of the housing 10, these lugs will clear each other on approximately the last turn of the ring and will come into engagement when the threads on the ring are brought up tight upon the threads on the housing. Thus it will be seen by this construction that a connecting means between the plate 15 and the housing is provided whereby the plate and likewise the latch member may be readily removed or replaced as desired. The stop 47 in connection with the lug 45 provides a means for properly positioning the latch member 30 so that it will be in a position to be engaged by the lever 12 when the operator of the car accidentally moves the lever towards the reverse position.

During the operation of the car the lever 29 is moved to the horizontal position with the arm resting on the laterally disposed lug 41. The latch member or block 30 which is connected to the rock shaft 28 will also be positioned horizontally and across the path of the movement of the lever 12 towards the reverse position as shown in Fig. 2. The block will at all times prevent the shift lever from being moved into the reverse position accidentally. If it be desired to remove the gear shift lever to the reverse position it is only necessary for the operator of the car to move the arm 29 upwardly and to a vertical position whence the latch member 30 will be moved to a vertical position and out of the path of the movement of the lever, thereby permitting the operator to move the lever into reverse position.

It will be noted that the arm 29 extends sufficiently beyond the lug 41 to permit the operator to conveniently raise the arm without any interference from the extension 40 on the bracket or plate 15.

The spring member 34 will exert a pull on the shaft 28 at all times so that the frictional resistance exerted by the shaft and the latch member 30 on the adjacent parts will be sufficient to maintain the lever in any of its adjusted positions particularly when the latch member 30 and the arm 29 have been moved to a vertical position.

It will be appreciated that while I have illustrated the locking device as applied to one form of gear shifting lever, said locking device may be applied to any type now in use or to those which have been accepted as standard in certain makes of automobiles.

I claim:

1. A safety latch for automobile gear shift levers, a shift lever housing provided with external threads, a ring having internal threads adapted to be threaded on to the housing, a plate rising from the ring, means on the upper end of the plate for engaging a gear shift lever for normally preventing said lever from being rocked into the reverse position, cooperating means on the ring and housing adapted to be engaged for properly positioning the latch with respect to the reverse position of the lever when the ring has been threaded onto the housing.

2. A safety latch for automobile gear shift levers, a shift lever housing provided with external threads, a ring having internal threads adapted to be threaded on to the housing, a plate rising from the ring, means on the upper end of the plate for engaging a gear shift lever for normally preventing said lever from being rocked into the reverse position, a lug projecting from the lower edge of the ring and a stop on the housing adapted to be engaged by said lug when the ring has been screwed into proper operating position for the latch.

3. In a safety latch for automobile gear shift levers, a shift lever housing provided with tapered external threads, a ring having an internal tapered surface provided with threads and adapted to be screwed on to the threads of the housing, a plate rising from the ring and a latch means adapted normally to prevent the shift lever from being moved into the reverse position, a lug projecting downwardly from the ring and a stop carried by the housing and adapted to be engaged by the lug when the ring has been screwed on to the housing and when the latch has been operatively positioned with respect to the lever.

ABRAM ALLEN STILL.